(12) United States Patent
Diego et al.

(10) Patent No.: US 6,488,145 B1
(45) Date of Patent: Dec. 3, 2002

(54) MATERIAL HANDLING LIFT GATE

(75) Inventors: Glenn T. Diego, Newark Valley, NY (US); David A. Deer, Binghamton, NY (US); John J. Ford, Johnson City, NY (US); Eugene C. Stradley, Owego, NY (US); Thomas Mozgawa, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/878,971

(22) Filed: Jun. 13, 2001

(51) Int. Cl.[7] ............................................... B65G 21/10
(52) U.S. Cl. ..................... 198/861.5; 198/581; 198/592
(58) Field of Search .............................. 198/632, 861.5, 198/950, 592, 581; 193/35 G; 186/66, 68

(56) References Cited

U.S. PATENT DOCUMENTS

| | | | | |
|---|---|---|---|---|
| 2,696,900 A | * | 12/1954 | Finstead | 198/592 |
| 2,803,327 A | * | 8/1957 | Kerr, Jr. | 198/632 |
| 3,353,652 A | * | 11/1967 | Fellner, Jr. | 198/632 |
| 4,852,712 A | * | 8/1989 | Best | 193/35 TE |
| 4,899,666 A | | 2/1990 | Meier | |
| 4,977,999 A | * | 12/1990 | Smock | 198/592 |
| 5,172,804 A | * | 12/1992 | Chersin | 198/861.5 |
| 5,224,584 A | * | 7/1993 | Best et al. | 198/782 |
| 5,568,857 A | * | 10/1996 | Chen et al. | 198/592 |
| 5,655,647 A | * | 8/1997 | Wheeler | 198/861.5 |
| 5,718,325 A | * | 2/1998 | Doster et al. | 198/592 |
| 5,944,169 A | | 8/1999 | Allen | |
| 6,110,088 A | * | 8/2000 | Mann | 493/188 |

* cited by examiner

*Primary Examiner*—Douglas Hess
(74) *Attorney, Agent, or Firm*—Whitham, Curtis & Christofferson, P.C.

(57) ABSTRACT

A material handling lift gate for allowing ingress and egress from a conveyor system. The material handling lift gate provides a mechanism for clearing packages from the lift gate prior to the opening thereof, as well as preventing packages from entering the lift gate when the lift gate is in an open position. The material handling lift gate includes a plurality of adjustable, telescoping vertical legs and opposing horizontal side rails hingedly mounted to an upper end of a pair of the plurality of adjustable, telescoping vertical legs or proximate thereto. The opposing horizontal side rails are positionable between a first closed position and a second open position. In further embodiments, the material handling lift gate includes a lift gate clear controller for controlling package movement into and out of the material handling lift gate.

21 Claims, 4 Drawing Sheets

MATERIAL HANDLING LIFT GATE

BACKGROUND OF THE INVENTION

1. Field of the Invention

The present invention generally relates to a material handling lift gate and, more particularly, to a self contained material handling lift gate capable of standalone or networked configuration for allowing a user ingress and/or egress through long conveyor runs or from conveyor loops.

2. Background Description

Material handling is important in many industries such as, for example, the airline industry, the freight industry as well as the postal industry. In these applications, a conveyor system is implemented in order to move or convey items from one location to another such as throughout a warehouse and the like. These conveyor systems automate the material handling practices of a particular industry which, in turn, reduces costs as well as much of the heavy lifting which would otherwise be left for manual labor.

In current practice, the conveyer system includes a plurality of drive rollers which carry the items throughout the conveyor system. As can be imagined, the drive rollers must be aligned in a continuous, seamless system thus enabling the packages or other items to be conveyed between two or more mutually remote locations. Thus, in larger applications such as in distribution centers, these systems can have very long conveyor runs and, in some instances, create a landlocked area within a conveyor loop. In either of these situations, it may be difficult for an operator or other user to gain access to within the conveyor loop or around a conveyor system in cases of long conveyor runs. Likewise, once an operator or other user is within the conveyer loop, for example, that person may also have difficultly in exiting from within the conveyor loop.

In these cases, a user or other personnel may either crawl underneath the conveyor system or climb over the conveyor system. To do this, the conveyor system should be "shut down" for safety reasons. However, shutting down the system may cause delays, bottlenecks and a host of other potential problems. Of course, it is not advisable nor recommended to climb over or crawl underneath such a system without taking every precaution such as shutting down the system. Also, such maneuvering may still not be possible by certain people who cannot crawl or climb over the conveyor due to a host of medical or other reasons.

On the other hand, a user may walk a very long distance in order to get around a long conveyor run. This method, safer than the previously mentioned methods, is time consuming and, in cases of very long conveyor runs, is not very practical. Also, there may be instances when an operator needs to immediately exit from the conveyor system due to a host of mechanical or other potential problems. In these cases, it is not even possible for the operator to walk around a long conveyor run due to certain time constraints imposed by such a mechanical problem or other emergency. However, at the present state of the art no structure facilitates quick and convenient crossing of a conveyer line to accommodate various different conveyor systems.

SUMMARY OF THE INVENTION

It is therefore an object of the present invention to solve the problems of known conveyor systems as described above.

It is another object of the present invention to provide a material handling lift gate which allows for easy ingress and egress from a conveyor loop or a long conveyor run.

It is still another object of the present invention to provide a material handling lift gate which is adaptable to either a standalone configuration or used in an existing conveyor system network.

It is also another object of the present invention to provide a material handling lift gate which ensures the safety of the user and the well being of the packages and/or items being conveyed on the conveyor system during ingress and egress.

It is yet another object of the present invention to provide a material handling lift gate which provides a mechanism for stopping the transportation of an item and/or clearing all items on the lift gate of the conveyer system during ingress and egress without significant interruption.

The present invention is directed to a material handling system and, more particularly, to a conveyer system with a lift gate mechanism. In a first aspect of the invention a material handling lift gate has a plurality of adjustable, telescoping vertical legs. The plurality of adjustable, telescoping vertical legs are adjustable and fixable to different conveyance heights. The system further includes opposing horizontal side rails hingedly mounted to an upper end of a pair of the plurality of adjustable, telescoping vertical legs or proximate thereto. The opposing horizontal side rails are positionable between a first closed position and a second open position. Drive rollers are disposed between the opposing horizontal rails and are adapted to transport items thereon.

In another aspect of the present invention, a material handling lift gate includes a plurality vertical legs and opposing horizontal side rails hingedly mounted to an upper end of a pair of the plurality of vertical legs or proximate thereto. Drive rollers are disposed between the opposing horizontal rails. A lift gate clear controller for controlling package movement into and out of the material handling lift gate via control of the drive rollers is also provided.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
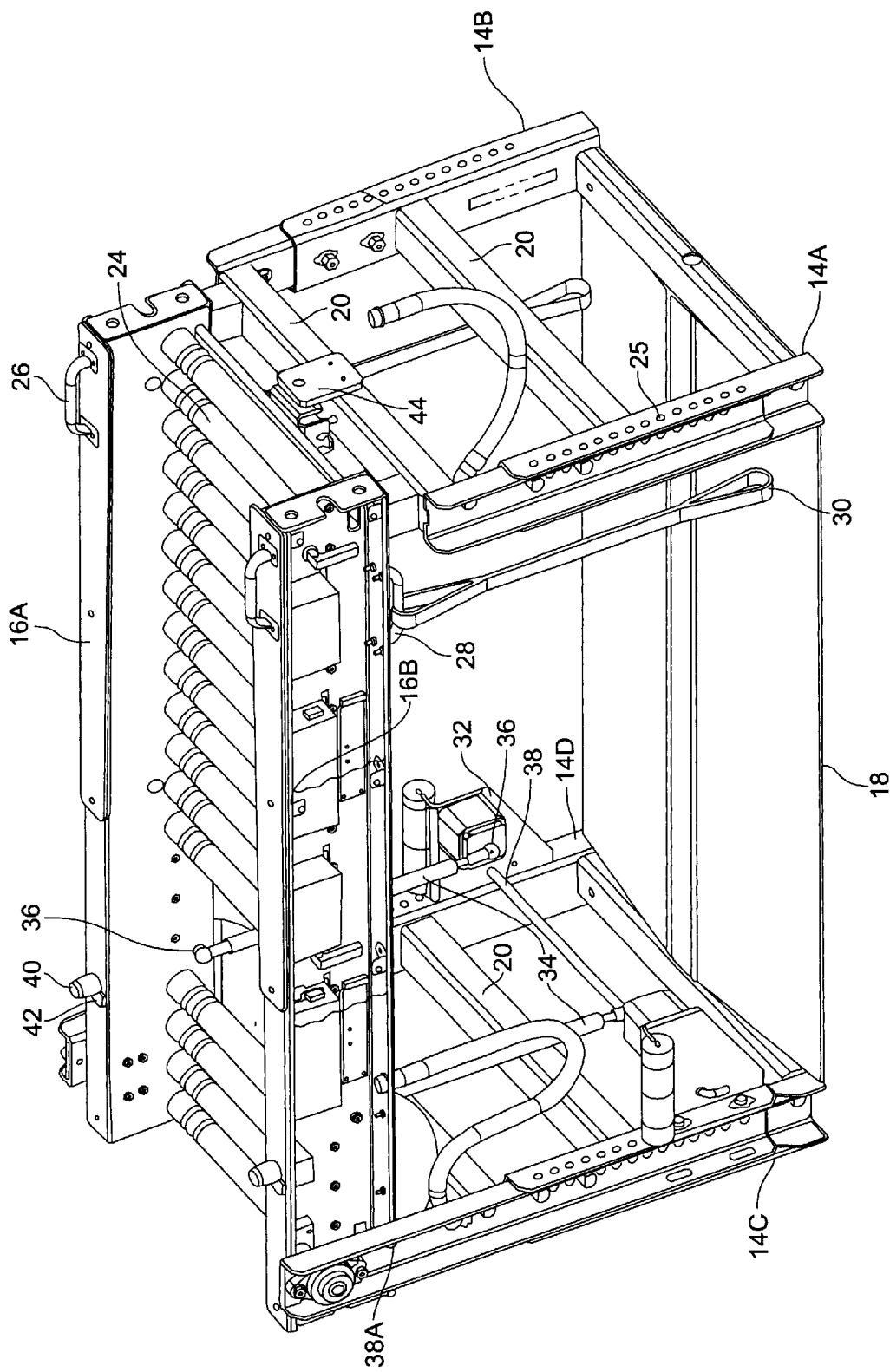
FIG. 1 is a plan view of the a material handling lift gate of the present invention.

Referring now to the drawings and, more particularly to FIG. 1, a material handling lift gate of the present invention is shown. The material handling lift gate is generally depicted as reference numeral 10 and includes a frame 12. The frame 12 includes preferably adjustable, telescoping vertical legs 14a, 14b, 14c and 14d, opposing upper horizontal side rails 16a and 16b and a lower fixed frame portion 18. The adjustable, telescoping vertical legs 14a, 14b, 14c and 14d may be configured to include opposing flange portions positioned between a center portion where each of the opposing flanges as well as the center portion has a plurality of apertures 15 disposed therethrough. Bolts, pins or other locking devices may be inserted through the apertures 15 of the adjustable, telescoping vertical legs 14a, 14b, 14c and 14d in order to fix or adjust the material handling lift gate 10 of the present invention at a predetermined height. Accordingly, the adjustable, telescoping vertical legs 14a, 14b, 14c and 14d allow for height adjustment of the material handling lift gate 10 such that it may be used with conveyor systems of varying height; that is, the material handling lift gate of the present invention is height adjustable for different conveyance elevation applications. In embodiments, horizontal bars 20 are disposed between the adjustable, telescoping vertical legs 14a, 14b, 14c and 14d. These horizontal bars 20 may be used for stability or for mounting components thereto.

Still referring to FIG. 1, the opposing upper horizontal side rails 16a and 16b are pivotally hinged to the vertical legs 14c and 14d via a bearing arrangement 22. Alternatively, the opposing upper horizontal side rails 16a and 16b may be pivotally hinged to one of the horizontal cross bars 20. Drive rollers 24 (for transporting the packages or other items) are disposed between the opposing upper horizontal side rails 16a and 16b, and a pair of handles 26 are provided on an upper surface of each of the opposing upper horizontal side rails 16a and 16b. The handles 26 are preferably positioned at an end opposite the bearing arrangement 22, and are used by the operator to lift the opposing upper horizontal side rails 16a and 16b and drive rollers 24 (collectively referred to as the lift gate) to an upright or open position. Similarly, a pair of handles 28 are provided on a bottom surface of the each of the opposing upper horizontal side rails 16a and 16b, at an end opposite the bearing system 22. Pull down straps 30 are secured to the pair of handles 28 which enable a user to pull down the lift gate, to the position shown in FIG. 1.

Figure 3:
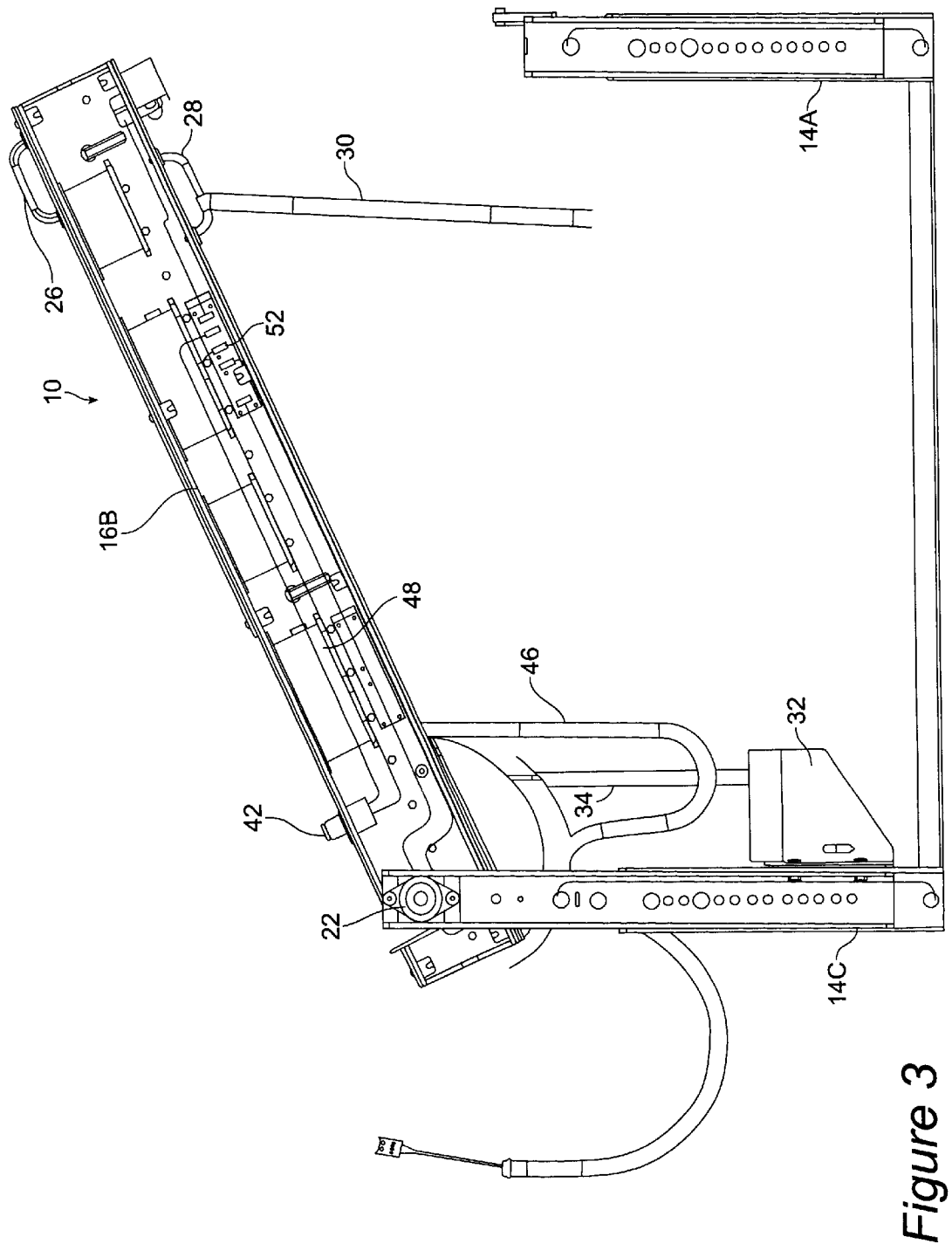
FIG. 3 is a side view of the material handling lift gate of the present invention in an open.

A pair of bracket mounts 32 extend from a substantial bottom portion of the respective adjustable, telescoping vertical legs 14c and 14d. A pair of gas assisted cylinders 34 is pivotally mounted between the pair of bracket mounts 32 and the opposing upper horizontal side rails 16a and 16b. At each end of the pair of gas assisted cylinders 34 are pivot attachments 36 which enable the gas assisted cylinders 34 to extend between a retracted position (FIG. 1) and an extended position (FIG. 3). The pair of gas assisted cylinders 34 partly or wholly provides the mechanism for lifting the lift gate, i.e., the horizontal side rails 16a, 16b and the drive rollers 24. It should be recognized by those skilled in the art that the gas assisted cylinders 34 may also assist the operator during manual lifting of the gate assembly 10. In embodiments, the manual lifting of the gate assembly 10 may be accomplished by using the handles 26.

FIG. 1 further shows a safety bar 38 extending between the mounting brackets 32. This safety bar 38 is removable and can be inserted within the apertures 38a when the gate assembly 10 is in the fully upright position. The placement of the safety bar within the apertures 38a will hold the gate assembly 10 in the upright position while the gas assisted cylinders 34 are removed for maintenance or other purposes.

Also, a lift gate clear button 40 and a legend plate 42 are provided on an upper side of the opposing upper horizontal side rails 16a and 16b. The lift gate clear button 40 and the legend plate 42 may also be positioned at any convenient location on the material handling system of the present invention. The lift gate clear button 40 may be depressed prior to egress by the operator. The depression of the lift gate clear button 40 prevents any additional packages or items from entering the material handling system of the present invention (via a controller). Also, the depression of the lift gate clear button 40 (via the controller) also allows any packages or items already within the material handling system to exit from the system. In other words, the controller activated by depressing the lift gate clear button will control the package movement into and out of the gate in preparation for gate opening. The lift gate clear button 40 or other indicia may provide an indication that the lift gate assembly is in operation, i.e., cleared.

A gate open switch 44 is mounted on both the upper portion of the lift gate and one of the horizontal bars 20 mounted between the adjustable, telescoping vertical legs 14a and 14b. (FIG. 4, discussed below, shows a detail of the mounting of the gate open switch 44.) The gate open switch 44 stops the driving of the drive rollers 24 when the lift gate is in an upright or open position.

Figure 2:
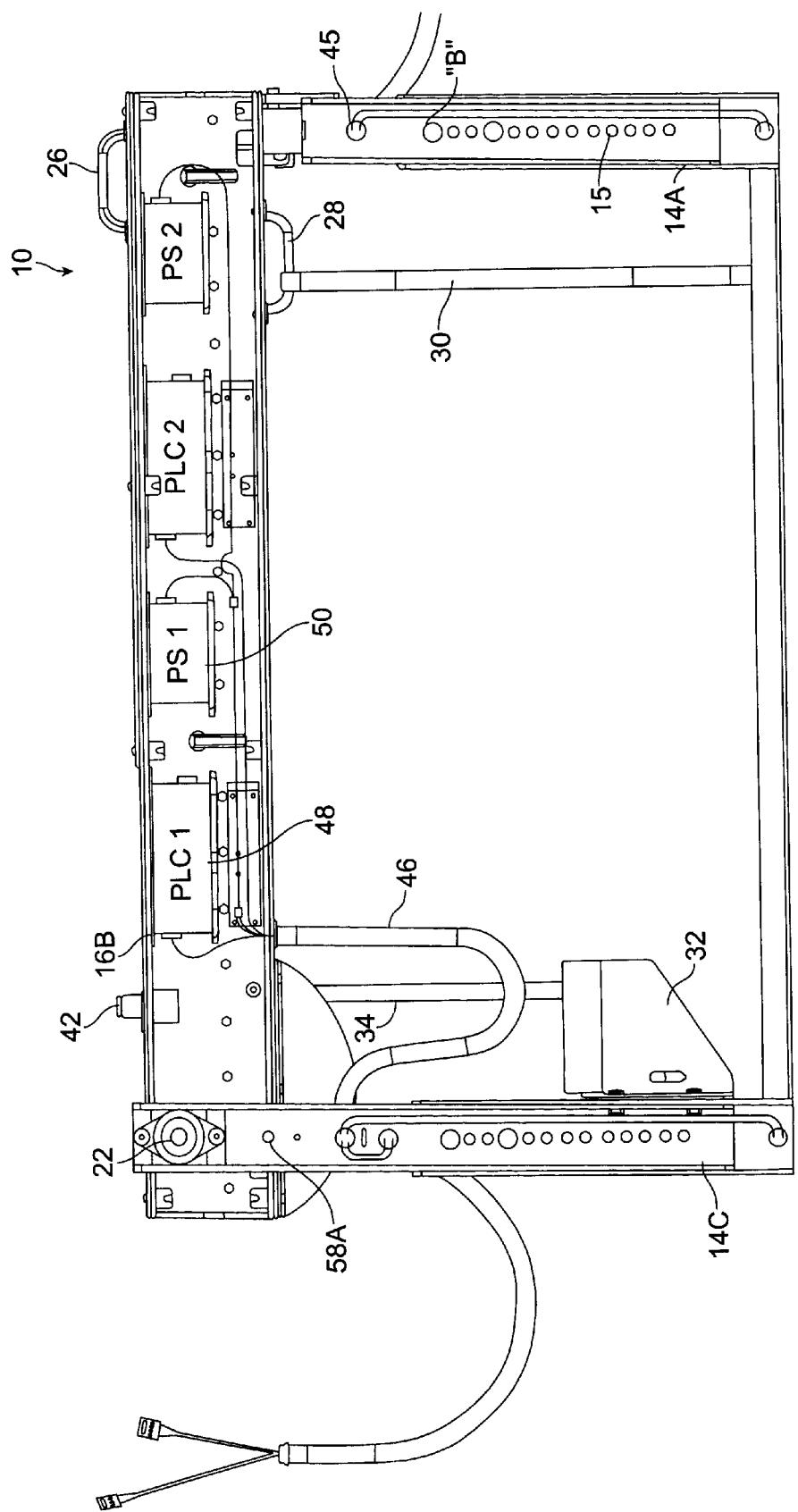
FIG. 2 is a side view of the material handling lift gate of the present invention.

FIG. 2 shows a side view of the material handling lift gate of the present invention. In this view, cable harnesses 46 are shown between controllers 48 and power sources 50, both mounted to a side of the horizontal side rail 16a. The controllers 48 may be associated with and activated by the lift gate clear button 40 as well as the switch 44. The cable harnesses 46 may be electrically connected to a network of conveyor systems. This view also shows the apertures 15 in the center portion of the telescoping vertical legs 14a and 14c. Bolts, pins or other locking mechanisms, generally depicted as "B", are provided within the apertures 15 in order to fix the height of the telescoping vertical legs 14a, 14b, 14c and 14d.

FIG. 2 further shows the mounting brackets 32 extending away from the vertical legs 14c and 14d. This position allows the gas assisted cylinders 34 to be offset from the hinge arrangement 22 thus allowing the gas assisted cylinders 34 to assist in the opening and closing of the lift gate. In the closed position of FIG. 2, the straps 30 will hang downward from the handles 28.

FIG. 3 shows the lift gate in an upright or open position. In this position, the gas assisted cylinders 34 are in an extended position, and the horizontal side rails 16a, 16b and the drive rollers 24 are in the open or upright position. In this manner, the bearing arrangement acts as a hinge mechanism so that the horizontal side rails 16a, 16b can pivot about the adjustable, telescoping vertical legs 14c and 14d. In the open position, the strap 30 remains hanging from the handles 28 and may be used to pull the lift gate into the closed or down position.

FIG. 3 further shows an electrical terminal 52 provided on the horizontal side rail 16b. The electrical terminal 52 provides a junction for connecting the lift gate clear button 40, the legend plate 42, the gate open switch 44 and other required components to the controllers 48 and/or the power source 50.

Figure 4:
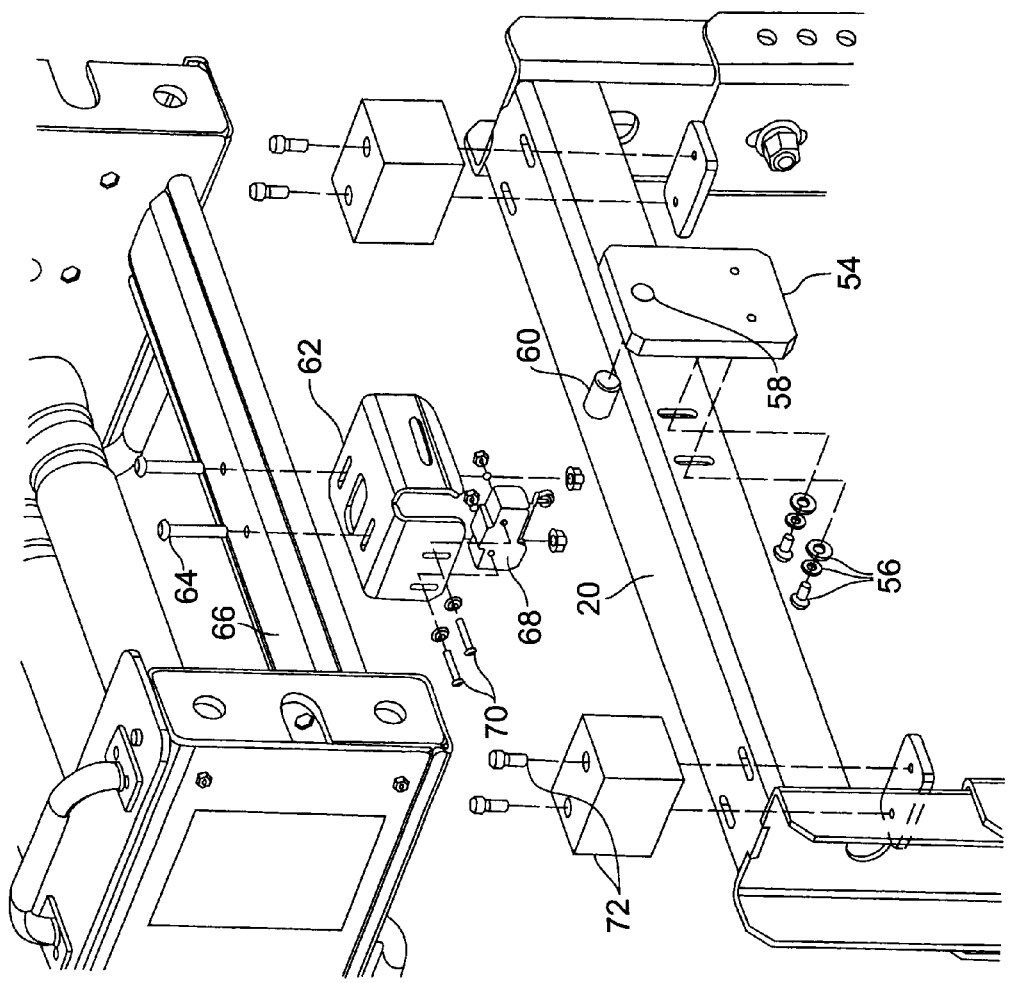
FIG. 4 is an exploded fragmentary view of a gate open switch implemented by the present invention.

FIG. 4 shows an exploded fragmentary view of the gate open switch 44. The gate open switch 44 includes a plate bracket 54 mounted to the horizontal bar 20, via fasteners 56. In this embodiment, the plate bracket 54 extends above the horizontal bar 20 and includes an aperture 58. A spring plunger 60 is fitted within the aperture 58 and extends in the direction of the drive rollers 24. A housing bracket 62 is mounted, via fasteners 64, to a cross bar 66 which extends between the opposing upper horizontal side rails 16a and 16b. A switch 68 is fastened to the housing bracket 62 by a plurality of fasteners 70. The switch 68 extends outward in the direction of the spring plunger 60, and contacts the horizontal bar 20 when the lift gate is in the closed position. The spring plunger 60 and switch 68 may alternatively be mounted to the other of the opposing horizontal side rails and the horizontal bar 20. A pair of blocks 72 may be mounted to the horizontal bar 20. In the closed position, the opposing upper horizontal side rails 16a and 16b rest on the respective blocks 72.

In the lift gate open position, the horizontal bar 20 disengages from the switch 68 thus cutting off power to the drive rollers 24. In the closed position, the switch 68 will contact the horizontal bar 20 thus restoring power to the drive rollers 24.

Example of Use

In use, an operator may first depress the lift gate clear button 40 prior to opening or lifting the lift gate of the present invention. The depression of the lift gate clear button will send a signal to the controllers which, in turn, will prevent any additional packages or items from entering the material handling system of the present invention. Also, the depression of the lift gate clear button 40 may also allow any packages or items already within the material handling system to exit from the system. The legend plate 42 provides an indication that the lift gate clear button 40 has been activated. It is noted that the operator does not have to depress the lift gate clear button 40 in order to open the lift gate of the present invention.

To open the lift gate, the operator will lift the opposing upper horizontal side rails 16a and 16b, preferably by the handles 26. By lifting the opposing upper horizontal side rails 16a and 16b, the gate open switch 44 will disengage and hence cut off the power to the drive rollers 24. This will ensure that no packages or other items will be transported through the material handling system of the present invention during egress (or ingress), i.e., when the lift gate is in the open position. The gas assist cylinders 34 may assist the user in opening the lift gate, or may equally be provided to perform the entire lifting or opening of the lift gate.

Once the operator has exited (or entered) the conveyor system, the operator will then close the lift gate by pulling down on either the handles 28 or the strap 30. The opposing upper horizontal side rails 16a and 16b will then rest on the blocks 72, and the horizontal bar 20 will contact with the switch 68 of the gate open switch 44. This contact of the switch 68 against the horizontal bar 20 will allow power to be reestablished to the drive rollers 24.

The material handling lift gate of the present invention is adjustable so that it may be used with and networked to different conveyor systems. In addition, the material handling lift gate may be a standalone unit which interacts with a conveyor run.

While the invention has been described in terms of preferred embodiments, those skilled in the art will recognize that the invention can be practiced with modification within the spirit and scope of the appended claims.

We claim:

1. A material handling lift gate, comprising:
   a frame:
   opposing horizontal side rails hingedly mounted to said frame, the opposing horizontal side rails being positionable between a first closed position and a second open position;
   drive rollers disposed between the opposing horizontal rails, the drive rollers adapted to transport items thereon; and
   a lift gate clear controller for simultaneously, via drive rollers including said drive rollers, preventing additional items from entering the lift gate and for allowing any items on the lift gate to exit, prior to lifting of the gate.

2. The material handling lift gate of claim 1, further comprising upper handles mounted on the opposing horizontal side rails remote from the hinged connection.

3. The material handling lift gate of claim 1, further comprising lower handles mounted on the opposing horizontal side rails remote from the hinged connection.

4. The material handling lift gate of claim 3, further comprising straps extending from the lower handles.

5. The material handling lift gate of claim 1, further comprising apertures disposed through the plurality of adjustable, telescoping vertical legs and locking means insertable through the apertures in order to fix the adjustable, telescoping vertical legs at a predetermined height.

6. The material handling lift gate of claim 1, further comprising a bearing arrangement which acts as a hinged mechanism for hingedly mounting the opposing horizontal side rails to the pair of adjustable, telescoping vertical legs.

7. The material handling lift gate of claim 1, further comprising gas assisted cylinders pivotally mounted between the opposing horizontal side rails and the pair of adjustable, telescoping vertical legs.

8. The material handling lift gate of claim 1, further comprising a means for providing an indication that the lift gate clear controller is activated.

9. The material handling lift gate of claim 1, including a plurality of controllers and power supplies for said drive rollers.

10. The material handling lift gate of claim 1, further comprising a gate open switch which stops driving of the drive rollers when the material handling lift gate is in an upright or open position.

11. The material handling lift gate of claim 10, further comprising:
   cable harnesses provided between controllers, a power source and conveyor systems; and
   an electrical terminal for providing a connection between the controllers, the power source, the conveyor systems, a lift gate clear button, a status legend associated with the lift gate clear button and the gate open switch.

12. The material handling lift gate of claim 10, wherein the gate open switch includes a spring plunger and an opposing switch, the spring plunger is mounted proximate to or on one of the plurality of adjustable, telescoping legs and the opposing horizontal side rails and the opposing switch is mounted proximate to or on the other one of the plurality of adjustable, telescoping legs and the opposing horizontal side rails, the switch extends outward in the direction of the spring plunger and contacts a horizontal cross bar when the opposing horizontal side rails are in the first closed position.

13. The material handling lift gate of claim 1, wherein the plurality of vertical legs are adjustable, telescoping vertical legs.

14. The material handling lift gate of claim 13, further comprising apertures disposed through the adjustable, telescoping vertical legs and locking devices insertable through the apertures in order to fix the adjustable, telescoping vertical legs at a predetermined height.

15. A material handling lift gate comprising:
   a plurality vertical legs;
   opposing horizontal side rails hingedly mounted to an upper end of a pair of the plurality of vertical legs or proximate thereto, the opposing horizontal side rails being positionable between a first closed position and a second open position;
   drive rollers disposed between the opposing horizontal rails, the drive rollers adapted to transport items thereon; and a lift gate clear controller simultaneously, via drive rollers including said drive rollers, preventing additional items from entering the lift gate and for allowing any items on the lift gate to exit, prior to lifting of the gate.

16. The material handling lift gate of claim 15, further comprising:
    upper handles mounted on the opposing horizontal side rails remote from the hinged connection; and
    lower handles mounted on the opposing horizontal side rails remote from the hinged connection.

17. The material handling lift gate of claim 15, further comprising a bearing arrangement which acts as a hinged mechanism for hingedly mounting the opposing horizontal side rails to the pair of vertical legs.

18. The material handling lift gate of claim 15, further comprising a status legend which provides an indication that the lift gate clear controller is activated.

19. The material handling lift gate of claim 15, further comprising a gate open switch which stops driving of the drive rollers when the material handling lift gate is in an upright or open position.

20. The material handling lift gate of claim 19, further comprising:
    cable harnesses provided between the lift gate clear controller, further controllers, a power source and conveyor systems; and
    an electrical terminal for providing a connection between the lift gate clear controller, the further controllers, the power source, the conveyor systems, a status legend and the gate open switch.

21. A conveyor system comprising:
    a conveyer of a predetermined length including drive rollers; and
    a modular material handling lift gate positioned as part of of the conveyer, the modular material handling lift gate comprising:
        a plurality vertical legs;
        opposing horizontal side rails hingedly mounted to an upper end of a pair of the plurality of vertical legs or proximate thereto, the opposing horizontal side rails being positionable between a first closed position and a second open position;
        drive rollers disposed between the opposing horizontal rails, the drive rollers adapted to transport items thereon; and
    a lift gate clear controller for simultaneously, via the drive rollers, preventing additional items from entering the lift gate and for allowing any items on the lift gate to exit, prior to lifting of the gate.

* * * * *